UNITED STATES PATENT OFFICE.

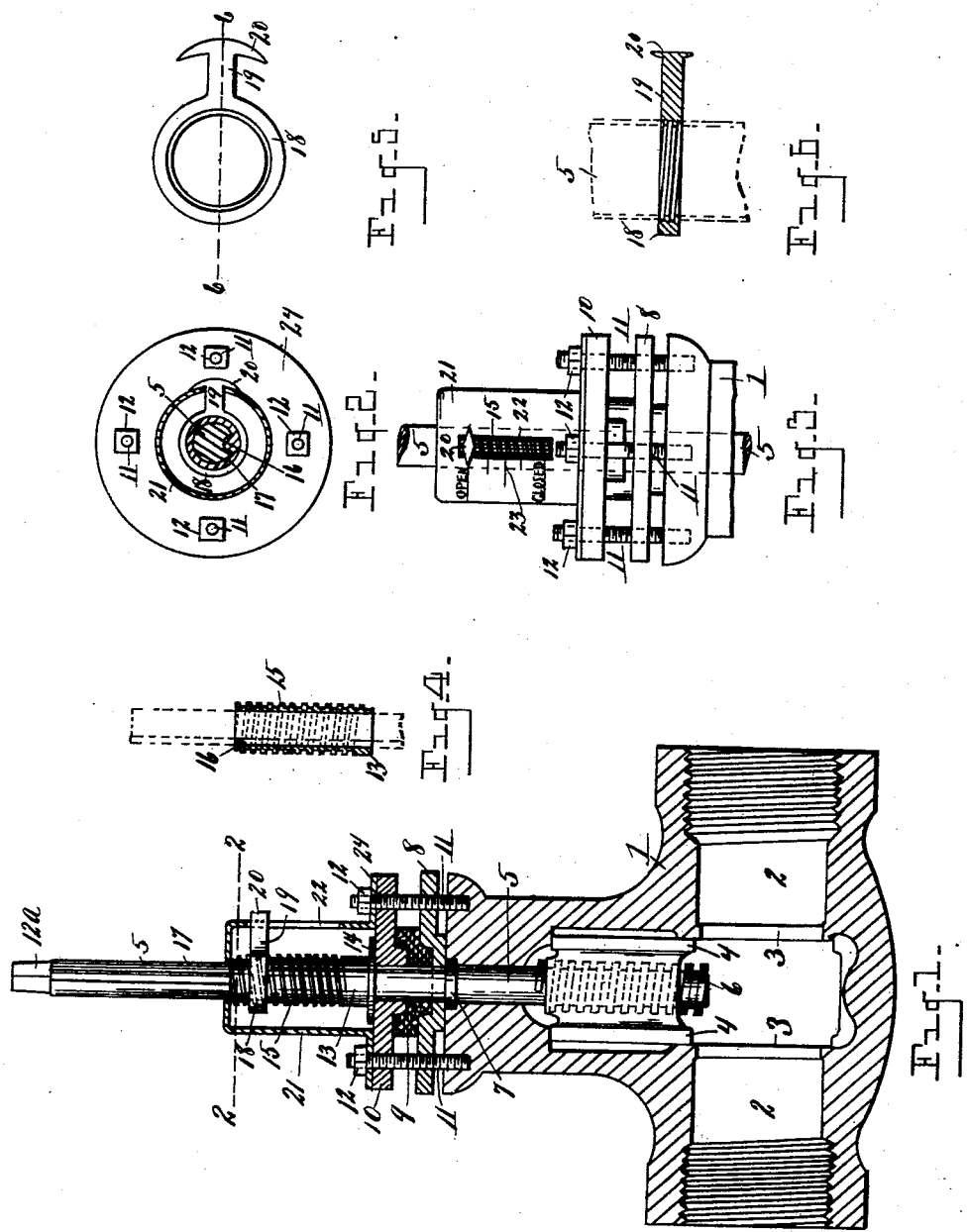

WILLIAM A. CHATHAM, OF BEEBETOWN, OHIO.

GATE-VALVE INDICATOR.

SPECIFICATION forming part of Letters Patent No. 684,191, dated October 8, 1901.

Application filed February 21, 1901. Serial No. 48,244. (No model.)

*To all whom it may concern:*

Be it known that I, WILLIAM A. CHATHAM, a citizen of the United States, residing at Beebetown, in the county of Medina, State of Ohio, have invented certain new and useful Improvements in Gate-Valve Indicators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an indicator for gate-valves; and it consists in the construction and arrangement of parts hereinafter fully set forth, and pointed out particularly in the claims.

The object of the invention is to provide simple and efficient means for indicating at all times the exact position of the valve, so as to enable the operator to determine whether the valve is open or closed and if open the degree of the opening. The above object is attained by the mechanism illustrated in the accompanying drawings, in which—

Figure 1 is an enlarged sectional view through a gate-valve involving my invention. Fig. 2 is a horizontal section as on line 2 2 of Fig. 1. Fig. 3 is a detail in elevation of a portion of the valve-case and the indicator-case surrounding the valve-stem. Fig. 4 is a detail in section through the threaded sleeve, which is splined to the valve-stem. Fig. 5 is a plan view of the threaded nut having the indicating-point. Fig. 6 is a section on line 6 6 of Fig. 5.

Referring to the characters of reference, 1 designates the valve-case of a gate-valve of the character to which my invention is applicable, said valve-case having the straightway opening 2, the valve-seat 3, and the valve-disks 4, adapted to close said opening and bear upon said seat. The valve-stem 5 is provided with a screw-thread 6 at its lower end and is adapted to have a threaded engagement with the valve-disks, whereby said disks are raised and lowered to open and close the valve by a rotation of the valve-stem in a manner well understood in the art. The valve-stem is provided with a collar 7, having a bearing in the case and upon which said stem is adapted to rotate, being held in place by the packing-ring 8, which surrounds the valve-stem and rests upon the case, said ring being concaved to receive the packing 9, which lies therein around the valve-stem and is confined in place by the gland 10, through which pass the bolts 11 into the valve-case, said bolts receiving the nuts 12 upon their upper ends, whereby the requisite pressure is exerted upon the gland to prevent any leak around the valve-stem. The upper end of the valve-stem is made square, as at $12^a$, to allow the application of a wrench or hand-wheel for operating the valve.

Fitting closely upon the upper end of the valve-stem is a sleeve 13, which rests upon a thin washer 14, lying upon the gland 10. The exterior of the sleeve 13 is provided with a suitable thread 15. It is desirable that said sleeve 13 shall rotate with the valve-stem 5, and to cause said parts to turn in unison the sleeve is provided with an inwardly-projecting lug 16, formed on the upper end thereof, which projects inwardly and is adapted to lie in the keyway 17 in said valve-stem, whereby said sleeve may be slipped over the end of the valve-stem and when in position is caused to rotate therewith. Adapted to screw onto the sleeve 13 is a collar 18, provided with an extension 19, carrying at its outer end a pointer 20. The sleeve 13 and the nut 18 are embraced and confined within a housing or case 21, having an opening through its top, through which the valve-stem is adapted to pass, and having a vertical slot 22 in the side thereof, through which the extension 19 on the nut 18 protrudes, so that the indicating-point 20 on said projection will stand adjacent to a scale 23, (see Fig. 3,) marked on the case 21, adjacent to the slot 22. The case 21 is provided with a laterally-extending flange 24 at the base thereof, which rests upon the gland 10 and through which the gland-bolts pass, the nuts 12 of said bolt confining said case in position and the aperture in the top of said case which embraces the valve-stem holding said case centrally in place. It will be understood that the relative number and pitch of the threads upon the valve-stem 5 and the sleeve 13 determine the comparative movement of the valve-disks and pointer 20, the arrangement in all cases being such that a rotation of the stem to move the valve-disks a certain distance will also cause the nut 13 upon the threaded collar to move a corresponding distance, so that the pointer 20 will indicate the exact position of the valve.

In the operation of the device as the valve-stem is rotated the sleeve 13, turning therewith, will cause the threads thereon to turn within the nut 18, which is held from rotation by reason of the extension 19 of said nut lying in the slot 22 of the case 21, whereby as the valve is opened and closed said nut will be caused to rise and fall and, through the medium of the pointer 20, indicate the position of the valve, by which means no mistake as to the position of the valve can be made, as the reading on the scale will show such position at a glance, obviating the damage which sometimes results in high-pressure-pipe systems of a mistake in the manipulation of the valve controlling the fluid-pressure therein. By securing the case 21 in position with the gland-nuts said case may be adjusted so as to cause the dial to face in any desired direction, and by mounting said case and the threaded sleeve upon the gland itself there can be no variation between the indicator and the scale upon the sleeve through any change in the vertical position of the gland.

In applying this device to different styles of valves a variation from the arrangement herein shown may be made without departing from the spirit of my invention.

Having thus fully set forth my invention, what I claim as new, and desire to secure by Letters Patent, is—

1. The combination of a valve having a rotary stem, a thread upon said stem, a nut or collar adapted to screw onto said thread, said nut being held from rotation, but adapted to travel vertically as the stem is rotated, an indicating-pointer projecting from said nut and a scale adjacent to said pointer.

2. In a valve, the combination of a rotary valve-stem, a threaded sleeve upon said valve-stem adapted to rotate therewith and to move longitudinally thereon, a threaded nut adapted to screw onto said sleeve, said nut having a projection carrying an indicating-pointer, a case embracing said sleeve and nut and having a vertical slot in which the projection on said nut lies, said case having a scale thereon adjacent to said slot adapted to be traversed by said pointer.

3. In a valve, the combination of a rotary valve-stem, a stuffing-box around said valve-stem, a gland for securing the packing in said stuffing-box, a threaded sleeve adapted to slide upon the valve-stem and to rotate therewith, said sleeve supported by said gland, a nut or threaded collar upon said sleeve having a lateral projection carrying a pointer, a case mounted upon said gland and embracing said sleeve and nut or collar, said case having a vertical slot therein through which the projection on said nut or collar extends, and a scale upon said case adjacent to said pointer.

In testimony whereof I sign this specification in the presence of two witnesses.

WILLIAM A. CHATHAM.

Witnesses:
J. M. PATTON,
F. M. COATES.